Oct. 28, 1947.  B. B. DE MASTERS  2,429,871
MEASURING STICK COUPLER
Filed Feb. 2, 1945

INVENTOR.
Ben B. DeMasters
BY
ATTORNEY.

Patented Oct. 28, 1947

2,429,871

UNITED STATES PATENT OFFICE 2,429,871

MEASURING STICK COUPLER

Ben B. De Masters, Kansas City, Mo., by decree of distribution, assignor to Josephine May De Masters Application February 2, 1945, Serial No. 575,882

1 Claim. (Cl. 287—63)

This invention relates to an article of manufacture in the character of a coupler for strip material, and particularly such an instrument for use in holding measuring stick sections in operative position for application to work of various and sundry types.

One of the important aims of this invention is to provide a measuring stick coupler that may be formed of a unitary piece of sheet material to frictionally engage a number of measuring stick sections and hold them in place while dimensions are being determined.

This invention has for a still further object to provide an article of manufacture in the nature of a measuring stick coupler which is cheap to manufacture; may be given without cost to customers of paint and wall paper stores with the advertising measuring sticks which are now conventionally presented gratuitously; and that is capable of holding a number of measuring stick sections in longitudinal alignment or with some of the sections at right angles to others.

Further aims of the invention will appear during the course of the following specification, referring to the accompanying drawing, wherein.

It has long been the practice of paint and wall paper companies to present its customers with yard sticks upon which certain advertising material is printed, and the trade now habitually looks forward to receiving such measuring sticks and using the same in computing room size and dimensions of other work. It is with such measuring devices or so-called "yard sticks" that the coupler embodying this invention, is designed for use.

Figure 1:
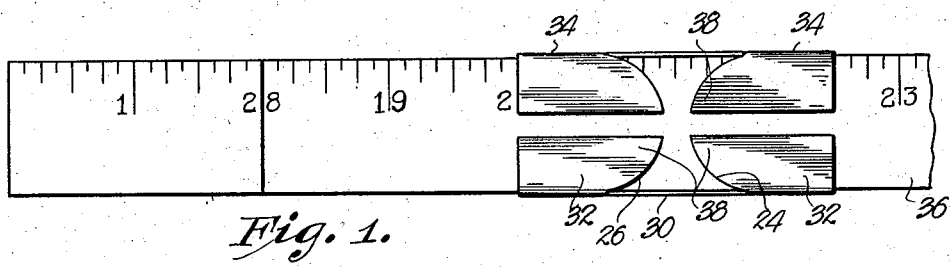
Fig. 1 is a top plan view of a measuring stick coupler made in accordance with the present invention and showing the same in place to hold two measuring stick sections in longitudinal alignment.
Figure 2:
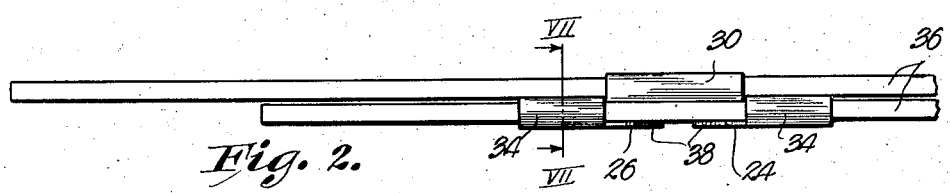
Fig. 2 is a side elevational view thereof.
Figure 3:
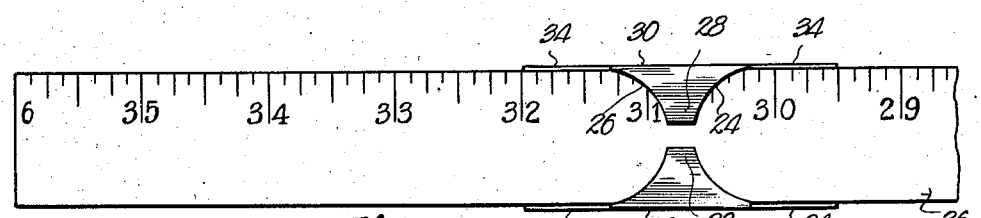
Fig. 3 is a bottom plan view of the assembly shown in Figs. 1 and 2.
Figures 4, 5:
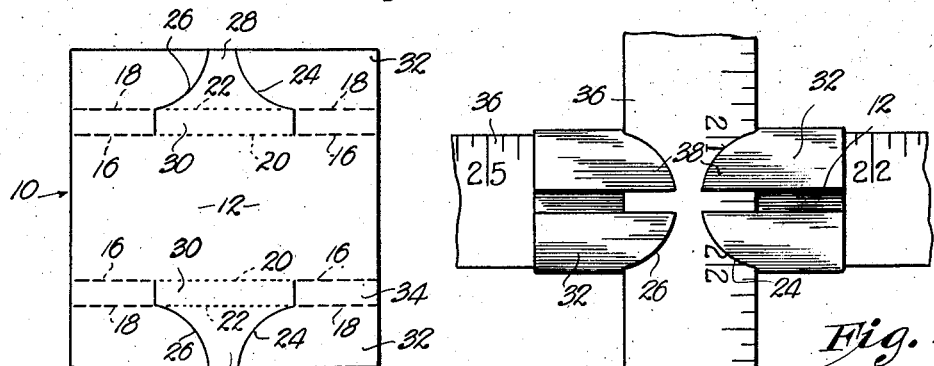
Fig. 4 is a top plan view of the coupler illustrating its ability to hold measuring stick sections in perpendicular relation to each other.
Fig. 5 is a plan view of the blank from which the coupler is produced.

The coupler per se is preferably made of a single sheet of material, which in blank form appears as illustrated in Fig. 5.

The blank is broadly designated by the numeral 10 and comprises a central parallel portion 12, along each longitudinal side whereof are lines of bend 16, 18, 20 and 22.

After the blank has been cut from stock, it is slit along lines 24 and 26 to segregate ears 28, walls 30, ears 32 and walls 34.

Figures 6, 7:
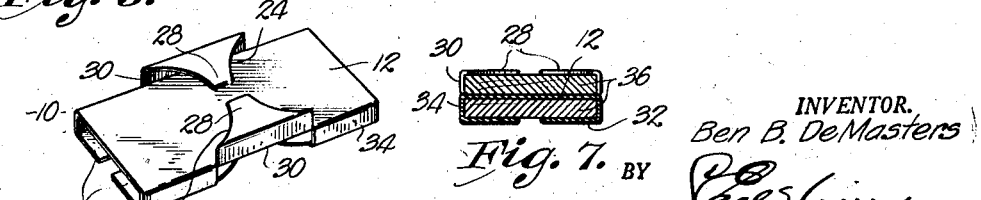
Fig. 6 is a perspective view of the coupler per se, entirely removed from association with the measuring stick sections.
Fig. 7 is a cross sectional view taken on line VII—VII of Fig. 2.

When ears 28 are disposed to overlie plate-like member 12, as shown in Fig. 6, these ears and walls 30 frictionally embrace section 36 of a measuring stick.

Ears 32 are bent into spaced relation with that face of plate 12 opposite to the face thereof whereover ears 28 are disposed. In other words, ears 28 are spaced to one side of plate 12, while ears 32 are spaced to the opposite side thereof.

The disposition of ears 28 is on a medial transverse line of plate 12 and ears 32 are at a point adjacent to the ends of plate 12.

The length of walls 30 or the distance between the proximal ends of walls 34, is substantially the same as the width of the measuring stick sections 36.

Ears 32 have extensions 38 to overlie one of the sections 36 when the said section is moved to the position shown in Fig. 4. Thus, the coupler may be used to hold two sections 36 at right angles to each other for use as a square or other tool in the handling of work.

The material from which the coupler is made is resilient enough to allow the insertion and removal of the measuring stick sections 36, and because of the size, disposition and relation of ears 28, 32 and plate 12, the relatively simple coupler may be employed to hold measuring stick sections 36 in a number of convenient working positions.

Having thus described the invention, what is claimed as new and desired to be secured by Letters Patent is:

A coupler for measuring stick sections, comprising a plate; a pair of ears on the plate intermediate the ends thereof and overhanging one face thereof in spaced relation to the one face for slidably receiving a section of a measuring stick between the ears and the said one face of the plate; a plurality of ears on the plate and overhanging the other face thereof in spaced relation to the other face, said plurality of ears being arranged in pairs with a pair at each end of the plate for slidably receiving another section of the measuring stick between the ears of each pair and the said other face, the distance between the ears of each pair being substantially the same as the width of the sections embraced thereby; and extensions on each of the plurality of ears at the center of the plate to frictionally engage a section of a measuring stick when a section is moved between the pairs of ears overhanging the said other face of the plate, the distance between the proximal inner edges of the ears of the last mentioned pairs at the point of merger thereof with the extensions being substantially the same as the said distance between the ears of each pair.

BEN B. DE MASTERS.

REFERENCES CITED

The following references are of record in the file of this patent:

UNITED STATES PATENTS

| Number | Name | Date |
|---|---|---|
| 686,711 | Cain | Nov. 19, 1901 |